(12) United States Patent
Babcock

(10) Patent No.: US 9,909,693 B2
(45) Date of Patent: Mar. 6, 2018

(54) CONCRETE REINFORCEMENT ELEMENTS AND STRUCTURES

(71) Applicant: Engineered Wire Products, Inc., Upper Sandusky, OH (US)

(72) Inventor: Jeffrey John Babcock, Ludington, MI (US)

(73) Assignee: Engineered Wire Products, Inc., Upper Sandusky, OH (US)

(*) Notice: Subject to any disclaimer, the term of this patent is extended or adjusted under 35 U.S.C. 154(b) by 0 days.

(21) Appl. No.: 14/632,821

(22) Filed: Feb. 26, 2015

(65) Prior Publication Data

US 2016/0252198 A1   Sep. 1, 2016

(51) Int. Cl.
| | |
|---|---|
| *E04C 2/42* | (2006.01) |
| *E04C 5/04* | (2006.01) |
| *E04F 15/06* | (2006.01) |
| *E04F 19/10* | (2006.01) |
| *F16L 9/08* | (2006.01) |
| *E04C 5/16* | (2006.01) |
| *E04C 5/06* | (2006.01) |

(52) U.S. Cl.
CPC ............ *F16L 9/085* (2013.01); *E04C 5/0627* (2013.01); *E04C 5/16* (2013.01)

(58) Field of Classification Search
CPC .......... F16L 9/085; E04C 5/0627; E04C 5/16; E04C 3/34; E04C 5/0609; E04C 5/0604; E04C 5/04; E04C 5/0613; E04C 5/0645; E04C 5/162; B21F 27/125; B21F 15/06; B21F 27/121; B21F 27/20; E04B 5/046; E04B 5/10
See application file for complete search history.

(56) References Cited

U.S. PATENT DOCUMENTS

| | | | | |
|---|---|---|---|---|
| 1,572,669 | A * | 2/1926 | Muller | E04H 12/12 52/649.2 |
| 3,302,348 | A * | 2/1967 | Pratt | E04B 1/942 52/223.8 |
| 3,375,632 | A * | 4/1968 | Congy | B21F 27/125 52/637 |
| 3,744,207 | A * | 7/1973 | Oroschakoff | B21F 27/121 52/649.3 |
| 5,392,580 | A * | 2/1995 | Baumann | B21F 27/125 52/646 |
| 5,802,802 | A * | 9/1998 | Wegler | E04B 5/046 249/95 |

(Continued)

*Primary Examiner* — Brian D Mattei
(74) *Attorney, Agent, or Firm* — Banner & Witcoff, Ltd.

(57) ABSTRACT

A prong is configured for use with a concrete reinforcement element and includes first and second legs positioned opposite first and second sides of the prong and a bridge portion connecting distal ends the legs, where the bridge portion forms a first end of the prong. The legs extend from the bridge portion to a second end of the prong opposite the first end, and each of the legs has a proximal end at the second end of the prong. The proximal end of the first leg is bent toward the second leg, and the proximal end of the second leg is bent toward the first leg, such that the proximal ends of the legs overlap each other. Inner surfaces of the proximal ends of the legs define engagement surfaces configured to engage a tie wire, enabling the proximal ends to be connected to the tie wire.

20 Claims, 7 Drawing Sheets

(56) References Cited

U.S. PATENT DOCUMENTS

| | | | |
|---|---|---|---|
| 5,924,458 A * | 7/1999 | Kaines | B21F 15/06 138/172 |
| 6,247,501 B1 * | 6/2001 | Kaines | E04C 5/0613 138/172 |
| 7,421,827 B1 * | 9/2008 | Konstantinidis | E04C 5/0604 52/252 |
| 9,279,246 B2 * | 3/2016 | Bronner | E04B 1/4178 |
| 2014/0068946 A1 * | 3/2014 | Kim et al. | E04C 5/012 29/897.34 |

* cited by examiner

CONCRETE REINFORCEMENT ELEMENTS AND STRUCTURES

TECHNICAL FIELD

The present invention generally relates to reinforcement structures for reinforcing concrete and other brittle materials, and more specifically, to reinforcement elements that include a number of prongs that can be formed into a mat or other connected structure and embedded within the concrete.

BACKGROUND

Certain structural materials, such as concrete, are very strong in compression, but relatively weak in tension and/or shear, and can behave in a brittle manner when cracks form. Various reinforcement structures can be used to address these issues, such as metal bars, wires, and similar structures. For example, reinforcing structures made of steel or other metals are typically embedded within the concrete to absorb tensile and/or shear loads and to resist brittle fracture and crack propagation. This can increase strength and durability and decrease the potential failure rate of the material.

Concrete pipe structures can benefit from such embedded reinforcement structures. For example, circular concrete pipe may experience shear and tensile forces when a radial force is exerted on the pipe, which can occur frequently in use. Square or rectangular concrete pipe (also known as box culvert) can experience similar tensile and shear loads when a force is exerted on one of the side walls of the pipe, as well as shear loads at the corners of the pipe. Thus, significant reinforcement structures are often provided at the points where these stresses are most frequently concentrated in the use of the concrete pipe. Such reinforcement structures can be provided in the form of a mat or other interconnected structure, which provides increased reinforcement over a large area. However, existing reinforcement structures for concrete pipe have certain disadvantages. For example, one type of existing reinforcement structure utilizes stirrups or prongs that are welded in place. In this configuration, the weld forms a weak point, such that the tensile strength of the structure is often limited by the strength of the weld (which can be significantly lower than the wire's tensile strength in some cases). Another type of existing reinforcement structure utilizes long oscillating reinforcement elements that are arranged roughly parallel to each other. Reinforcement structures of this type can provide increased tensile strength, however, these structures provide limited options for spacing, alignment, and orientation of the reinforcement elements relative to each other. This, in turn, can limit the number of applications in which these reinforcement structures can be used.

Thus, while certain reinforcement structures according to existing designs provide a number of advantageous features, they nevertheless have certain limitations. The present disclosure seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Certain aspects of the disclosure relate to a prong configured for use with a concrete reinforcement element, including a first leg positioned on a first side of the prong and a second leg positioned on a second side of the prong opposite the first side, and a bridge portion connecting distal ends the first leg and the second leg, where the bridge portion forms a first end of the prong. The first and second legs extend from the bridge portion to a second end of the prong opposite the first end, and each of the first and second legs has a proximal end at the second end of the prong. The proximal end of the first leg is bent toward the second leg, and the proximal end of the second leg is bent toward the first leg, such that the proximal ends of the first and second legs overlap each other. Further, inner surfaces of the proximal ends of the first and second legs define engagement surfaces configured to engage a tie wire, enabling the proximal ends to be connected to the tie wire.

According to one aspect, the bridge portion has a bend of at least 180° and a radius of curvature of about 0.5 inch.

According to another aspect, the first leg forms a left side of the prong, and the second leg forms a right side of the prong. In this configuration, the proximal end of the first leg may be bent to the right to extend past the proximal end of the second leg, and the proximal end of the second leg may be bent to the left to extend past the proximal end of the first leg. Additionally, the proximal ends of the first and second legs may each be bent at an angle of at least 90°. Further, the engagement surfaces may be defined by curved portions of the inner surfaces of the proximal ends of the first and second legs. Still further, the first and second legs may be configured to be in the same general plane at the first end of the prong, and the proximal ends of the first and second legs are in different planes.

According to a further aspect, the proximal ends of the first and second legs each have a bend portion, and the bend portion of each of the first and second legs has a radius of curvature of about 0.09" to about 0.11".

Additional aspects of the disclosure relate to a concrete reinforcement element including a tie wire having a length and a plurality of prongs connected along the length of the tie wire, each of the prongs being spaced from adjacent prongs. Each of the prongs may be configured according to aspects described herein. The proximal end of the first leg extends on a first side of the tie wire and is bent toward the second leg to extend at least partially around an underside of the tie wire, and the proximal end of the second leg extends on a second side of the tie wire opposite the first side and is bent toward the first side to extend at least partially around the underside of the tie wire. The second ends of each prong are connected to the tie wire by welding, such that at least a portion of each of the proximal ends of the first and second legs is welded to the underside of the tie wire.

According to one aspect, the element is configured such that an applied load sufficient to cause failure of one of the prongs when exerted on the bridge portion of the prong in a direction away from the tie wire is higher than a bond strength of the welding.

According to another aspect, the element is configured such that an applied load sufficient to cause failure of one of the prongs when exerted on the bridge portion of the prong in a direction away from the tie wire is approximately equal to an applied load sufficient to cause fracture of the prong.

According to a further aspect, the proximal ends of the first and second legs overlap each other, and wherein confronting surfaces of the proximal ends of the first and second legs contact each other while overlapping.

According to yet another aspect, the at least a portion of each of the proximal ends of the first and second legs is welded to the underside of the tie wire defines a curved surface that is welded to the tie wire.

Further aspects of the disclosure relate to a concrete reinforcement mat that includes a plurality of concrete reinforcement elements, each configured according to aspects described herein and having a prong according to aspects described herein. A plurality of cross-wires are connected to the plurality of concrete reinforcement elements by connection to the tie wires, such that the concrete reinforcement elements are all positioned in spaced relation and extending along a first direction, and the cross-wires are connected between the concrete reinforcement elements in spaced relation to each other and extend along a second direction transverse to the first direction.

According to one aspect, the prongs on each reinforcement element may be aligned or may not be aligned with the prongs on adjacent reinforcement elements. Additionally, the prong spacing on adjacent reinforcement elements may be substantially equal in one embodiment.

According to another aspect, the mat is configured such that an applied load sufficient to cause failure of one of the prongs when exerted on the bridge portion of the prong in a direction away from the tie wire is higher than a bond strength of the welding.

According to a further aspect, the mat is configured such that an applied load sufficient to cause failure of one of the prongs when exerted on the bridge portion of the prong in a direction away from the tie wire is approximately equal to an applied load sufficient to cause fracture of the prong.

According to yet another aspect, the at least a portion of each of the proximal ends of the first and second legs is welded to the underside of the tie wire defines a curved surface that is welded to the tie wire.

Still further aspects of the disclosure relate to a reinforced concrete pipe that includes a concrete wall defining a central passage, the concrete wall having an internal reinforcement structure that includes a plurality of concrete reinforcement elements according to aspects described herein embedded within the concrete wall. The concrete reinforcement elements may include prongs configured according to aspects described herein.

According to one aspect, the concrete wall has a circular shape in cross-section, and the internal reinforcement structure extends around an arc of approximately 45° on a top portion and a bottom portion of the concrete wall.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which.

Figure 1:
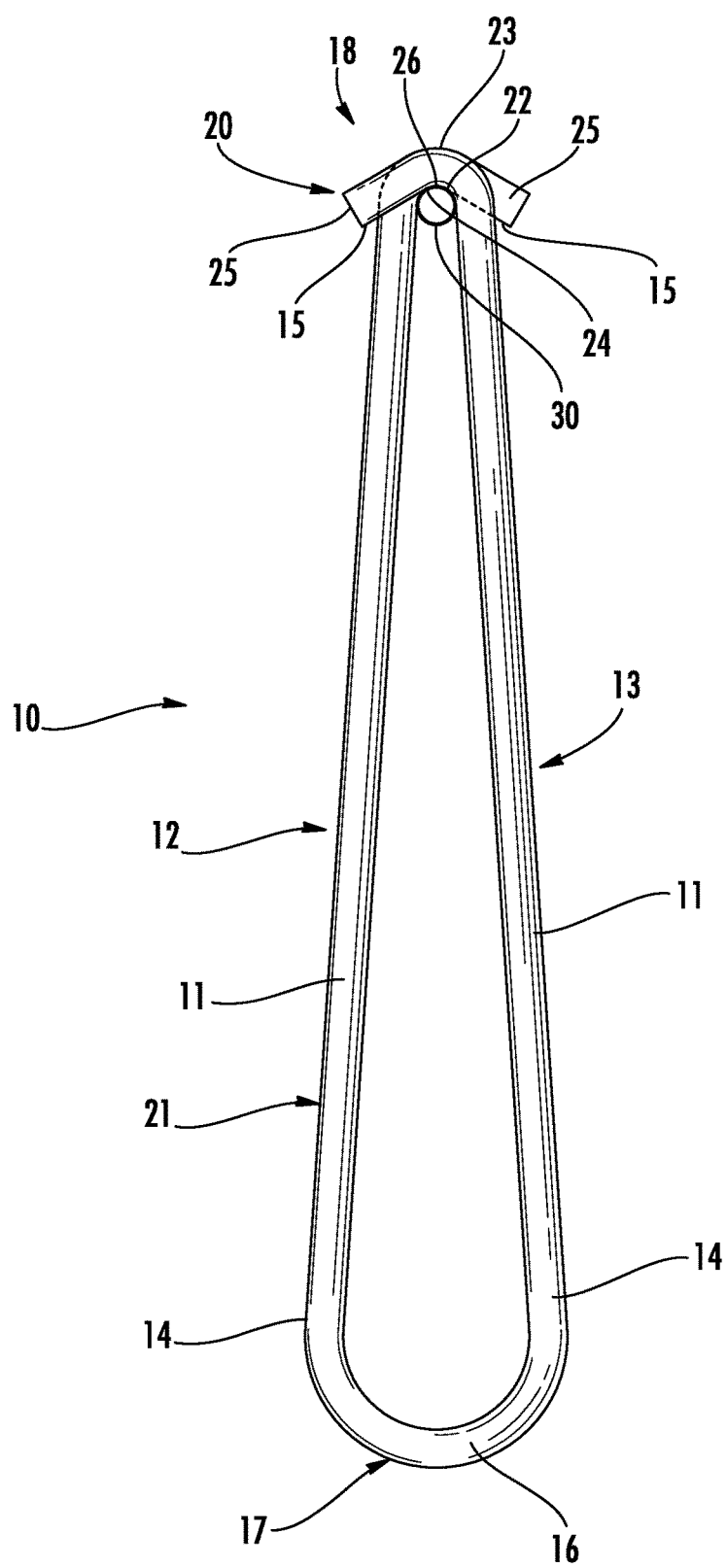
FIG. 1 is a front view of one embodiment of a prong forming a portion of a reinforcement element according to aspects of the present disclosure.

It is understood that certain components may be removed from the drawing figures in order to provide better views of internal components.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "primary," "secondary," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

Figure 2:
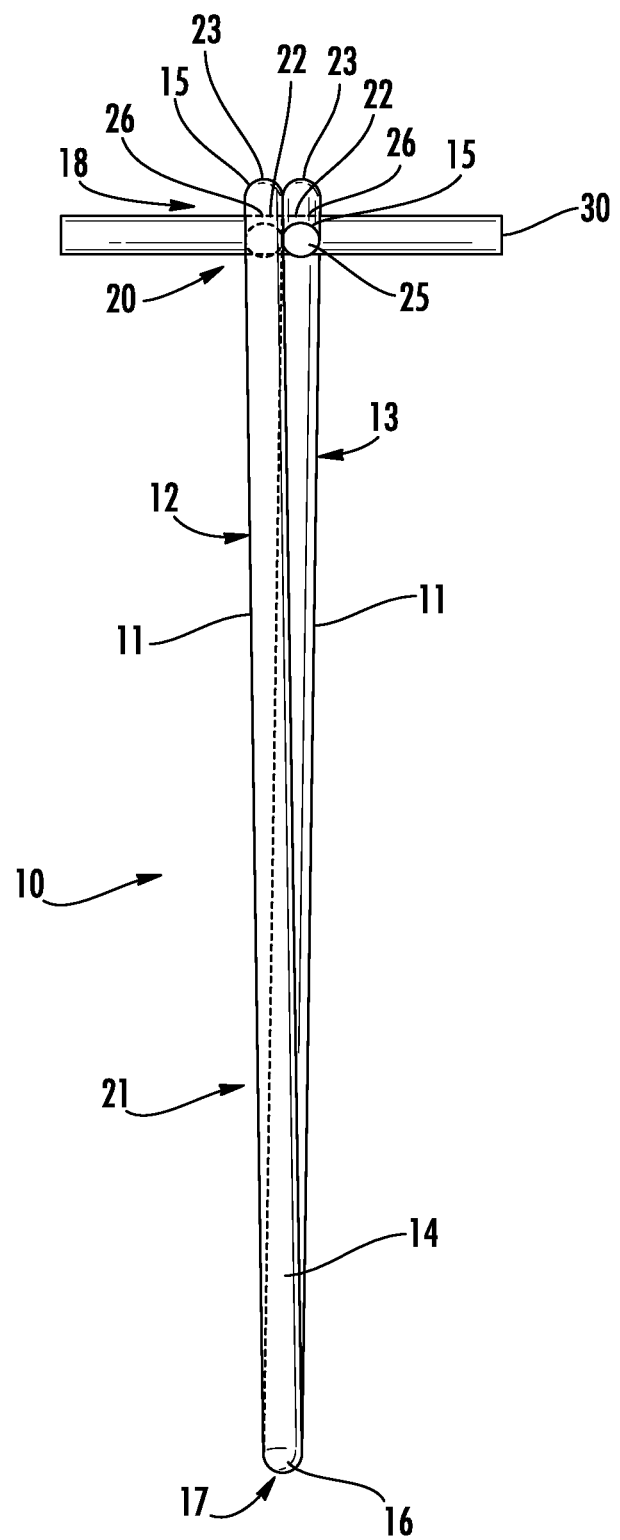
FIG. 2 is a side view of the prong of FIG. 1.
Figure 3:
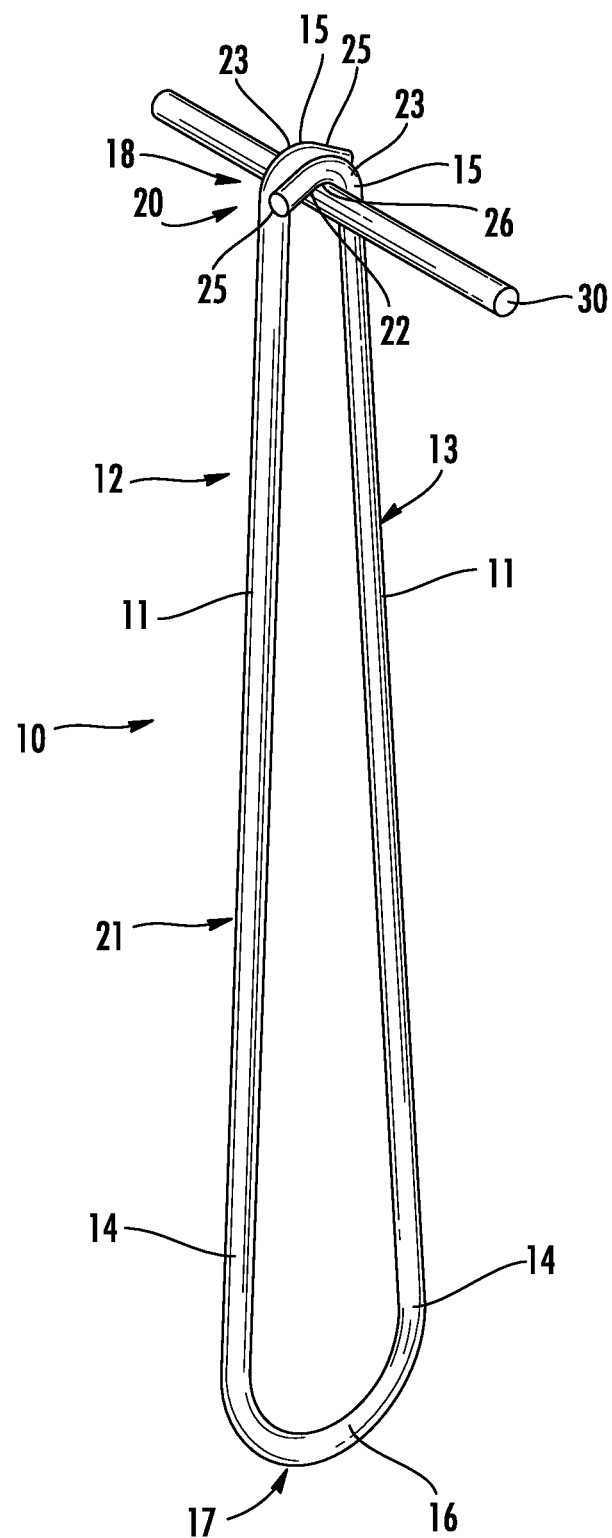
FIG. 3 is a perspective view of the prong of FIG. 1.

Referring now in detail to the Figures, FIGS. 1-3 illustrate one embodiment of a prong that is usable in connection with aspects described herein, generally designated with the reference numeral 10. The prong 10 is configured to function as a portion of a reinforcement structure that is partially or completely embedded within a structural material (e.g., concrete), to provide structural reinforcement to the material. The prong 10 generally includes a connecting portion 20 for connecting the prong 10 to a reinforcement structure and a protruding portion 21 configured to protrude from the reinforcement structure into the material to reinforce the material and anchor the prong 10 within the material. The prong 10 is formed of a metal wire, which may have a circular cross-section or a different cross-section, that is bent or otherwise formed into an appropriate shape in one embodiment. The prong 10 may be partially or completely formed of a different material and/or using a different technique in another embodiment. In one embodiment, the prong 10 may be formed of a wire having a diameter of 0.120" to 0.209" (e.g., 11 ga to 5 ga), or possibly to 0.243", which results in an average stirrup prong steel area $A_V$ of 0.011 to 0.034, or possibly to 0.045. In the embodiment illustrated in FIGS. 1-3, the prong 10 is made of a smooth wire, with a generally smooth outer surface. In another embodiment, the prong 10 may be made from "deformed wire," which has intentional deformations or other structural features (e.g., ridges, recesses, etc.) on the outer surface to enhance bonding with the structural matrix material (e.g., concrete). This deformed wire could be positively deformed or negatively deformed, in various embodiments. It is understood that the use of deformed wire could alter the calculation of the average prong steel area $A_V$, due to the non-constant cross-section of deformed wire.

The embodiment of the prong 10 illustrated in FIGS. 1-3 has first and second legs 11 on the first and second sides 12, 13 (i.e., the left and right sides from the perspective shown in FIG. 1), respectively. The legs 11 are connected to each other at first or distal ends 14 thereof, such as by the use of a bridge portion or connecting portion 16 that connects the two legs 11. The legs 11 are further configured for engagement with and/or connection to a portion of a reinforcement element, such as a tie wire 30, at their second or proximal ends 15. In this configuration, the bridge portion 16 forms a first or distal end 17 of the prong 10, and the proximal ends 15 of the legs 11 form a proximal end 18 of the prong 10.

The bridge portion 16 in the embodiment of FIGS. 1-3 has a smoothly curved shape that arcs at least 180° to connect the distal ends 14 of the legs 11 together. In one embodiment, the legs 11 are closer together at their proximal ends 15, and the distance between the legs 11 increases toward their distal ends 14. In this configuration, the legs 11 are angled away from each other at their distal ends 14, such that the bridge portion 16 forms an arc of greater than 180°. In one embodiment, the bridge portion 16 is semi-circular and has a radius of curvature of approximately 0.5 inch, but may have a different size in another embodiment. The bridge portion 16 may also have a different shape in another embodiment, such as a polygonal shape (e.g., square, triangular, etc.), a semi-elliptical shape, or an irregular shape. It is understood that the shapes and sizes of the legs 11 and the bridge portion 16 may be dictated by the intended use or application of the prong 10. The legs 11 and the bridge portion 16 in the embodiment illustrated in FIGS. 1-3 form the protruding portion 21 of the prong 10.

The proximal end 15 of each leg 11 is configured for engagement with a portion of a reinforcement structure, such as a tie wire 30, and thereby form the connecting portion 20 of the prong 10. In the embodiment of FIGS. 1-3, the proximal end 15 of each leg 11 is bent to wrap around a portion of the tie wire 30, which provides an engagement surface 22 for engaging and/or connecting to the tie wire 30. The engagement surfaces 22 may be considered to engage an underside of the tie wire 30 in this configuration, and it is understood that the term "underside" does not refer to any particular arrangement or orientation, but rather, that the "underside" of the tie wire 30 is the side opposite the distal end 17 of the prong 10. The proximal ends 15 of the legs 11 in this configuration may therefore be considered to have a hook-like shape. In this configuration, the proximal end 15 of each leg 11 has a bend portion 23 that is bent toward the tie wire 30 and/or toward the opposite side 12, 13 of the prong 10. For example, as shown in FIGS. 1-3, the bend portion 23 of the leg 11 on the first side 12 of the prong 10 is bent toward the second side 13, and the bend portion 23 of the leg 11 on the second side 13 of the prong 10 is bent toward the first side 12. In some embodiments, the bend portion 23 of each leg 11 may be bent at an angle of at least 90° or at least 100°, and in another embodiment, the bend portion 23 of each leg 11 may be bent at an angle of at least 120°. In a further embodiment, the bend portion 23 of each leg 11 may be bent to an angle that does not exceed 125°, or that does not exceed 135°. It is understood that the aforementioned upper and lower limits may be considered in conjunction with each other. Additionally, in one embodiment, the bend portion 23 of each leg 11 may be bent around the tie wire. In one embodiment, the minimum radius of curvature of the bend portion 23 may be from about 0.09" to about 0.11", depending on wire size and application. For example, the minimum radius of curvature of the bend portion 23 is 0.089", which may be used, e.g., for a prong 10 made from 11, 10, 9, 8, or 7 gauge wire around a 7 gage tie wire. As another example, the minimum radius of curvature of the bend portion 23 is 0.096", which may be used, e.g., for a prong 10 made from 6 gage wire around a 6 gage tie wire. As a further example, the minimum radius of curvature of the bend portion 23 is 0.104", which may be used, e.g., for a prong 10 made from for 5 gage wire around a 5 gage tie wire.

As shown in FIGS. 1-3, the legs 11 have engagement surfaces 22 that are configured for engaging and/or connecting to the tie wire 30. In one embodiment, the engagement surfaces 22 are at least partially defined by curved portions of the inner surfaces (or curved inner surfaces) 24 of the proximal ends 15 of the legs 11. These curved inner surfaces 24 are formed by the bend portions 23 of the legs 11. In one embodiment, as shown in FIGS. 1-3, each leg 11 has a straight or relatively straight tail portion 25 extending from the bend portion 23 to the tip of the leg 11. These straight tail portions 25 also partially define the engagement surfaces 22 in one embodiment, or the engagement surfaces 22 may be completely defined by the bend portions 23 in another embodiment. The bend portions 23 may extend all the way to the tips of the legs 11 in a further embodiment, such that no straight tail portions 25 are present.

As shown most clearly in FIGS. 2 and 3, the proximal ends 15 of the legs 11 overlap each other and are positioned adjacent each other when configured for connection to the tie wire 30. As shown in FIG. 1, the proximal end 15 of the right leg 11 is positioned in front of the proximal end 15 of the left leg 11 in one embodiment, although this configuration can be reversed. This overlapping configuration gives the prong 10 a shape such that the distal ends 14 of the legs 11 are generally aligned with each other and/or in the same general plane as each other, while the proximal ends 15 of the legs 11 are in different planes from each other. Additionally, the overlapping and confronting surfaces of the proximal ends 15 of the legs 11 may engage or contact each other in one embodiment, such that the engagement surfaces 22 generally form a single platform for engaging the tie wire 30. Further, in one embodiment, the proximal ends 15 of the legs 11 may have sufficient length that they extend past each other as they overlap. In other words, the proximal end 15 of the leg 11 on the first side 12 (the left side in FIG. 1) extends beyond the second side 13 of the prong defined by the opposite leg 11, and the proximal end 15 of the opposite leg 11 on the second side 12 (the right side in FIG. 1) extends beyond the first side 12 of the prong defined by the first leg 11. In another embodiment, the legs 11 may have lengths and/or bent configurations such that no portion of the proximal end 15 of each leg 11 extends beyond the opposite side 12, 13.

The prong 10 may be connected to a tie wire 30 or other component of a reinforcement structure by use of the legs 11 with the proximal ends 15 bent around the tie wire 30, as described herein. In one embodiment, the prong 10 may initially be provided in a pre-bent configuration, which is then bent to the final shape. The pre-bent prong 10 may be a straight piece of wire in one embodiment. The pre-bent prong 10 is then bent to the final shape to place the engagement surfaces 22 of the legs 11 into engagement with the tie wire 30, including further bending the bend portions 23 around the tie wire 30. Once the prong 10 is in position, the legs 11 are welded to the tie wire 30 to secure the connection. In one embodiment, as shown in FIGS. 1-3, each of the engagement surfaces 22 of the prong 10 are welded to the tie wire 30 at a single weld point 26 on the underside of the tie wire 30. These weld points 26 may be along the same side of the tie wire 30 and generally aligned with each other in the axial direction of the tie wire 30. In other embodiments, a different number and/or location of weld points 26 may be used. For example, weld points may additionally or alternately be placed along the sides (left and right in FIG. 1) of the tie wire 30.

When connected to a tie wire 30 as shown in FIGS. 1-3, the prong 10 has increased strength relative to a reinforcement component that is connected by welding without the use of the bend portions 23. For example, in one embodiment, the applied load sufficient to cause failure of the prong 10 when exerted on the bridge portion 16 in a direction away from the tie wire 30 (i.e., the "pull force") is higher than the bond strength of the welding. As another example, in one embodiment, the applied load sufficient to cause failure of the prong 10 when exerted on the bridge portion 16 in a direction away from the tie wire 30 (i.e., the "pull force") is approximately equal to the applied load sufficient to cause fracture the prong itself, i.e., the fracture of any portion of the prong wire. In this configuration, the prong 10 has its maximum possible failure resistance, because only forces near or at the force sufficient to fracture the prong 10 itself will cause failure. This increases the maximum reinforcement strength provided by the prong 10 to the concrete in which it is embedded. It is understood that the prong 10 may be used in reinforcement applications and configurations different from those shown and described herein by way of example. For example, the prong 10 may be configured for connection to a structure other than a tie wire 30, in the same or a similar configuration to that described herein.

Figure 4:
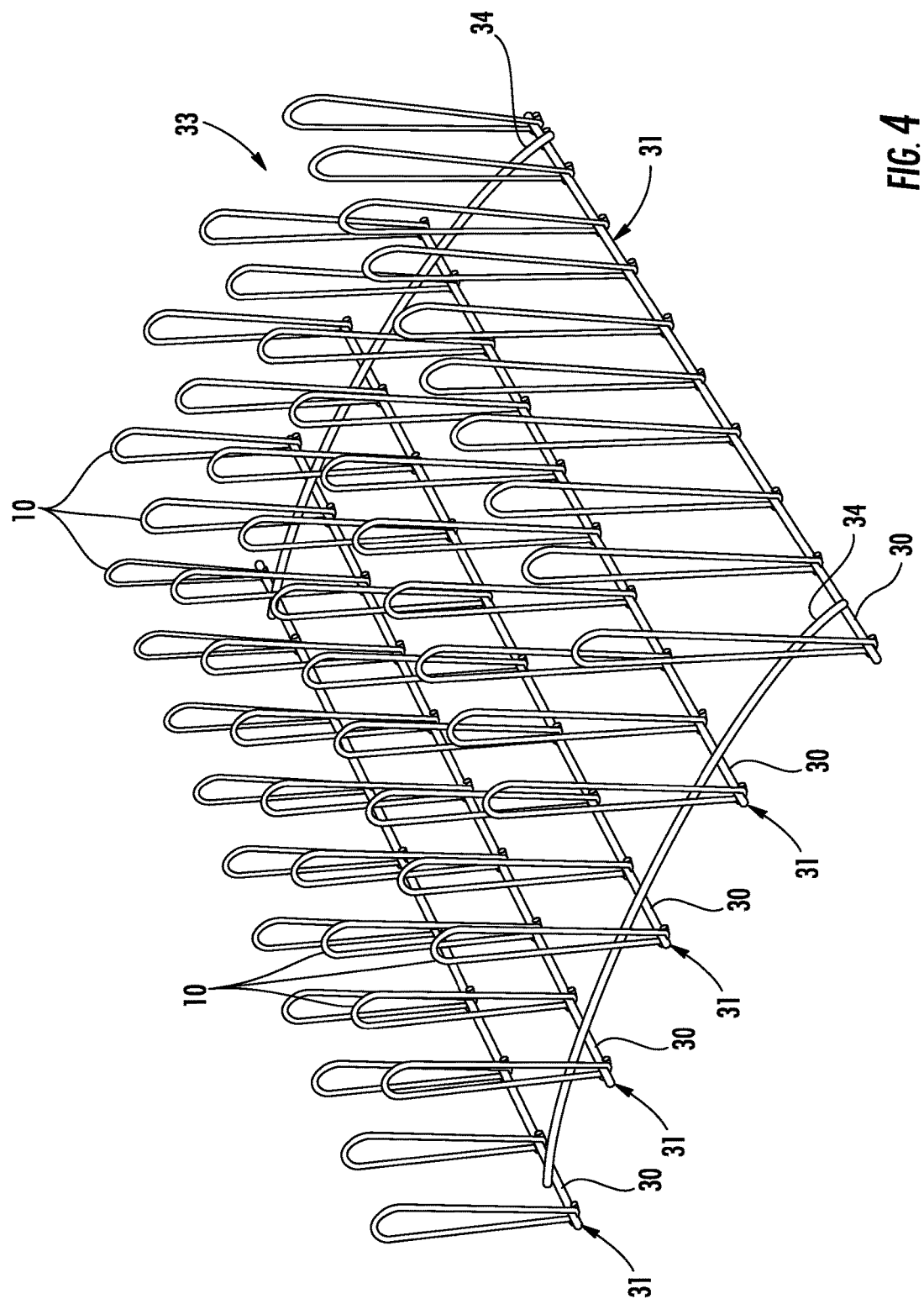
FIG. 4 is a perspective view of one embodiment of a reinforcement mat including a plurality of reinforcement elements according to aspects of the present disclosure.
Figure 5:
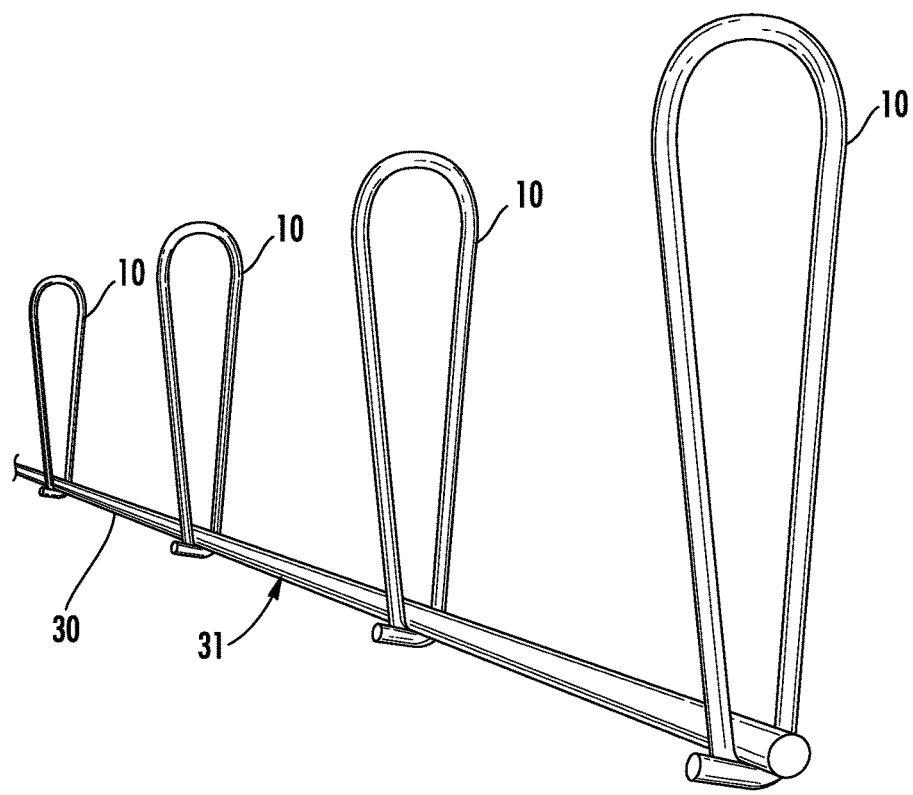
FIG. 5 is a perspective view of one embodiment of a reinforcement element according to aspects of the present disclosure.
Figure 6:
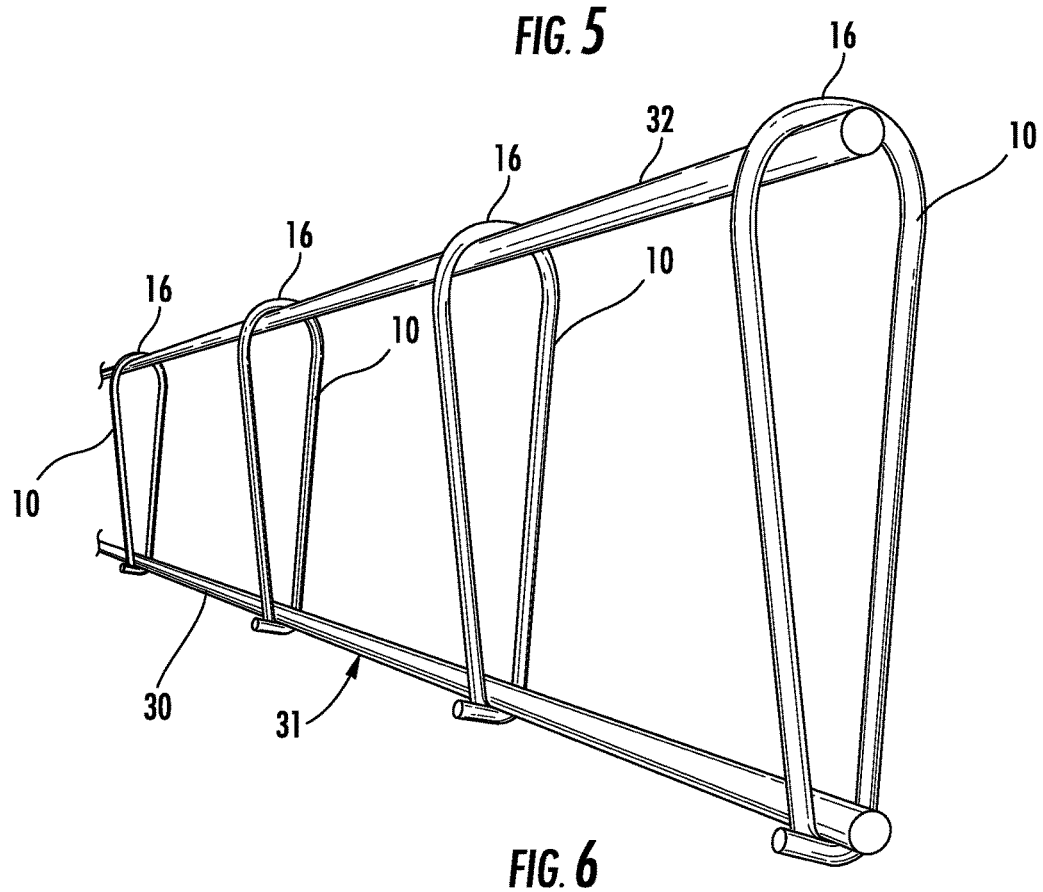
FIG. 6 is a perspective view of another embodiment of a reinforcement element according to aspects of the present disclosure.

The prong 10 may be used in connection with various reinforcement structures for concrete reinforcement, as illustrated in FIGS. 4-7. A plurality of prongs 10 may be connected to a single tie wire 30 to create a reinforcement element 31, as illustrated in FIG. 5. The prongs 10 may be connected to the tie wire 30 at locations spaced along the length of the tie wire 30. In one embodiment, the prongs 10 may be connected to the tie wire 30 at constant spacing intervals. Any spacing intervals can be used, including variable spacing intervals, and the prongs 10 configured as shown in FIGS. 1-3 provide the advantage of permitting any spacing interval to be used. Additionally, the prongs 10 may all be oriented in generally the same direction in one embodiment, such as in FIG. 5, where all of the prongs 10 are extending upward from the tie wire 30. Different connection configurations and orientations may be used in other embodiments. Further, the reinforcement element 31 may include a lock rod 32, such as shown in FIG. 6, which may be useful or required for certain applications. The lock rod 32, if used, may be secured to the distal end 17 of the prong 10, such as by use of a wire tie or welding to the inner side of the bridge portion 16, as shown in FIG. 6. The lock rod 32 may not be secured to the prong 10, in an alternate configuration.

The prong 10 may have various different sizes, including different heights, as measured in the direction between the distal and proximal ends 17, 18 of the prong 10, which creates different prong amplitudes when the prong 10 is connected to the tie wire 30. For example, the prong 10 may be configured to provide an amplitude of from 1.75" to 20" in one embodiment, or from 2" to 18" in another embodiment. Likewise, the spacing of the prongs 10 may be adjusted to nearly any desired spacing.

Figure 8:
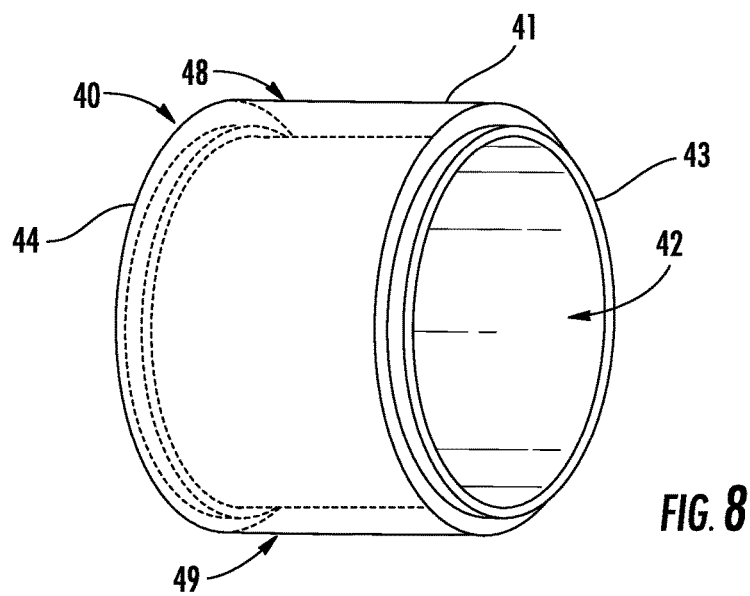
FIG. 8 is a perspective view of one embodiment of a concrete pipe according to aspects of the present disclosure.
Figure 9:
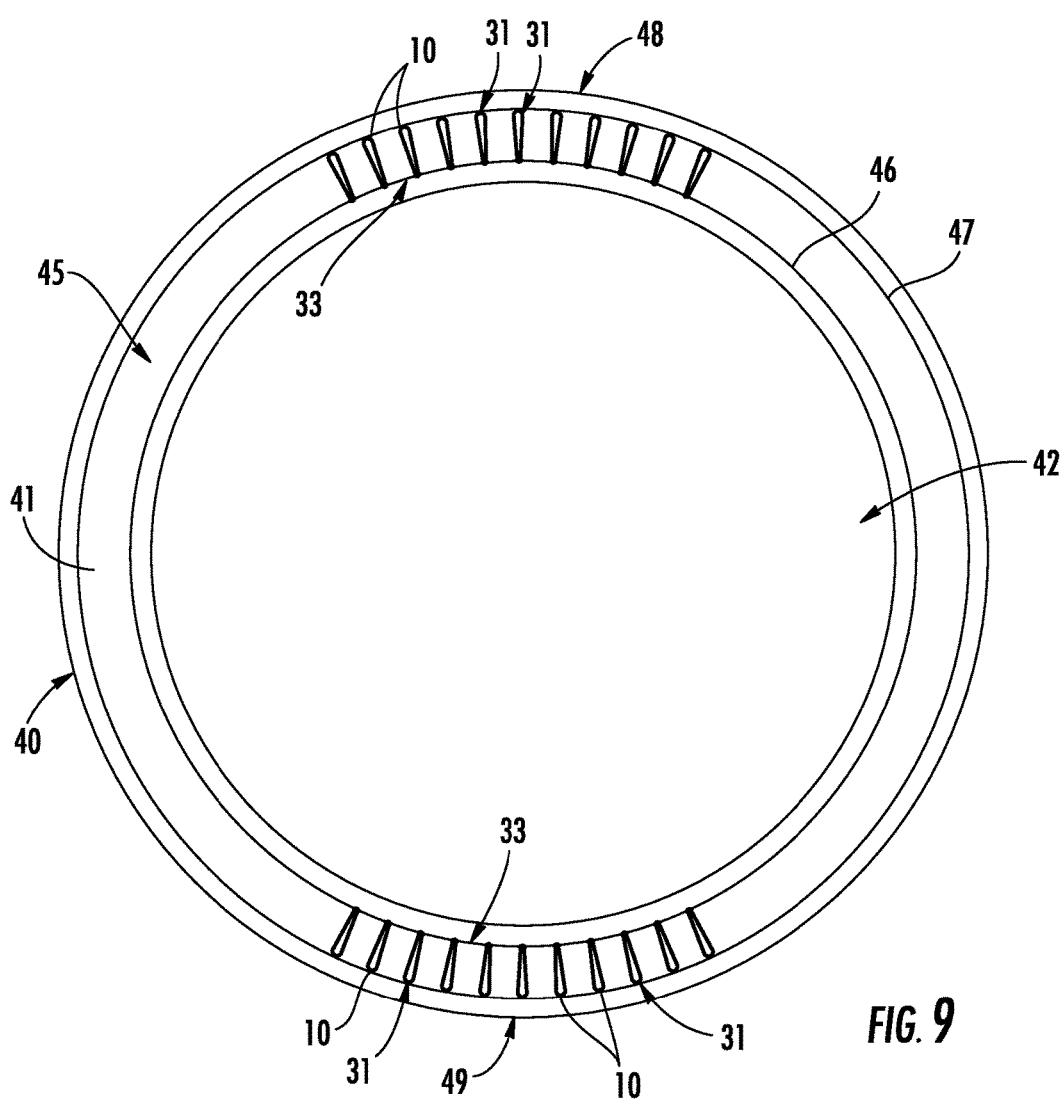
FIG. 9 is a cross-sectional view of the concrete pipe of FIG. 8.

A plurality of reinforcement elements 31 as shown in FIG. 5 may be connected together to form a reinforcement mat 33 as shown in FIG. 4. The reinforcement mat 33 shown in FIG. 4 includes a plurality of reinforcement elements 31 positioned to extend parallel to each other, with cross-wires 34 connecting the reinforcement elements 31 to each other. More specifically, as shown in FIG. 4, a plurality of cross-wires 34 are connected to the reinforcement elements 31 by connection to the tie wires 30, such that the reinforcement elements 31 are all positioned in spaced relation to each other and extending along a first direction, and the cross-wires 34 are connected between the reinforcement elements 31 in spaced relation to each other and extend along a second direction transverse to the first direction. As shown in FIG. 4, the mat 33 may have a slight curvature, such that it is configured for use in a curved structure. The mat 33 in FIG. 4 is depicted, for example, in a configuration as may be installed in a curved component, such as a pipe 40 as in FIGS. 8-9. It is understood that the tie wires 30 and/or cross-wires 34 may be produced in a straight configuration and bent as desired. It is also understood that some or all of the bending of the tie wires 30 and/or cross-wires 34 may be non-permanent or non-plastic, and that the bent wires 30, 34 may be held in bent shapes by other adjacent structures (e.g., cages 46, 47 as shown in FIG. 9). The spacing of the reinforcement elements 31 and/or the cross-wires 34 may be constant in one embodiment, or may be variable in another embodiment. Additionally, different reinforcement elements 31 within the mat 33 can utilize the same or similar prong configurations (e.g., position, spacing, orientation, etc.) or may use varying prong configurations. For example, in one embodiment, all reinforcement elements within the mat 33 may have prongs 10 that are all configured with the same structure and spaced equal or substantially equal distances. The structure of the prong 10 enables such varying configurations.

Figure 7:
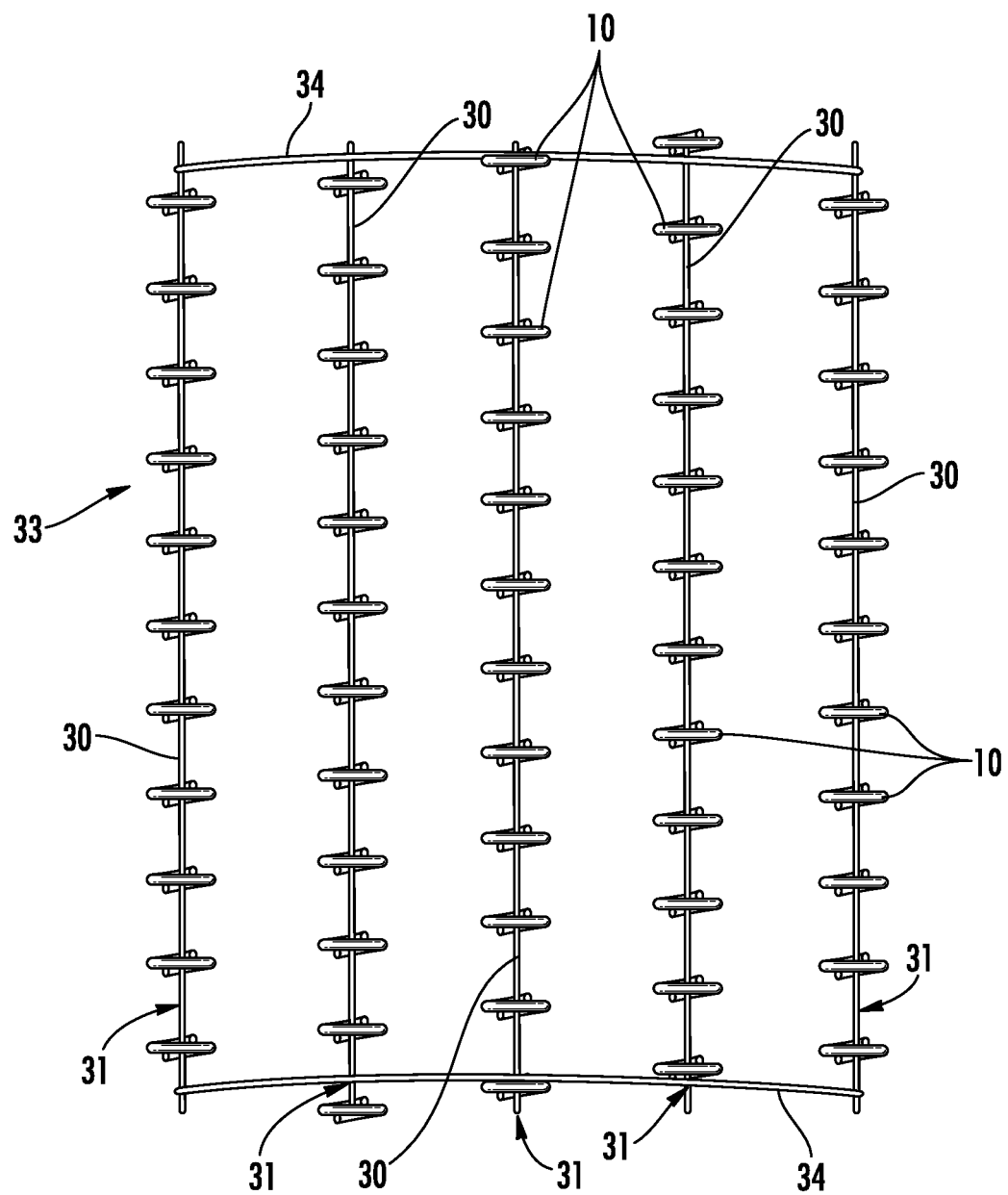
FIG. 7 is a top view of another embodiment of a reinforcement mat including a plurality of reinforcement elements according to aspects of the present disclosure.

In one embodiment, the mat 33 may be configured such that the prongs 10 in each element 31 are staggered with respect to the prongs 10 in one or more adjacent elements 31, which can be referred to has having a "pitched" arrangement. For example, FIG. 7 illustrates an embodiment of a mat 33 that uses prongs 10 having a pitched arrangement, in which the prongs 10 of adjacent elements 31 are progressively staggered in the same direction. This creates a corkscrew-like orientation of the prongs 10 with respect to each other. A mat 33 with prongs 10 in a pitched arrangement as shown in FIG. 7 may be configured for use with cages 46, 47 having a "spiral" or "helical" configuration. Other varied and/or staggered configurations are possible, as the prongs 10 can be connected to the reinforcement structure in nearly any position or orientation.

The reinforcement structures described herein, including the prongs 10 and the reinforcement elements 31 and mats 33 including the prongs 10, may be used to reinforce structural materials, such as concrete. In one embodiment, a mat 33 as shown in FIG. 4 or FIG. 7 may be used to reinforce a concrete pipe 40, as shown in FIGS. 8-9. The pipe 40 illustrated in FIGS. 8-9 is a circular pipe segment that has a circular wall 41 having a tubular shape with cylindrical inner and outer walls and a circular central passage 42. The pipe 40 has a spigot 43 extending around one end and a bell 44 extending around the other end. The spigot 43 can fit within the bell 44 of an adjacent pipe segment 40 to connect multiple segments to each other. As shown in FIG. 9, the pipe 40 includes a reinforcement structure 45 that includes an inner cage 46, an outer cage 47, and a reinforcement mat 33 connected to at least one of the inner and outer cages 46, 47. In this embodiment, the inner and outer cages 46, 47 are both formed of a plurality of metal rods and/or wires interconnected together, such as in a cross-hatching pattern, to form a tubular structure. The reinforcement structure may also include spacers (not shown) between the cages 46, 47. One or more mats 33 can then be connected to the inner and/or outer cages 46, 47, such as by tie wires (not shown) or welding. In one embodiment, as shown in FIG. 9, one or more mats 33 are connected to the inner cage 46 by tie wires (not shown) or welding. The prongs 10 of the mat(s) 33 extend from the inner cage 46 toward the outer cage 47, but do not connect to or contact the outer cage 47 in this embodiment. The reinforcement structure, including the cages 46, 47 and the mat(s) 33 are then placed in a form, mold, etc., and the concrete material is then formed (e.g., by pouring) around the reinforcement structure, such that the cages 46, 47 and the mat(s) 33 are embedded within the concrete. In another embodiment, only a single cage or a larger number of cages may be used, as well as additional reinforcement structures.

The mat(s) 33 may be positioned only around a portion of the perimeter of the pipe 40 in some embodiments. As a point of reference, the pipe 40 includes a top portion 48, which includes top (outer) and crown (inner) surfaces, and a bottom portion 49, which includes bottom (outer) and invert (inner) surfaces. For example, as shown in FIG. 9, the pipe 40 has mats 33 connected at the top portion 48 of the pipe 40 and the bottom portion 49 of the pipe 40, which are the points of the pipe 40 that receive the greatest tensile and shear stresses (e.g., radial tension and diagonal shear), due to force exerted at these points in use. In one embodiment, the mats 33 extend up to 90° around the top 48 and the bottom 49 of the pipe 40. In another embodiment, the mats 33 extend 45° to 90° around the top portion 48 and the bottom portion 49 of the pipe 40. In a further embodiment, the mats 33 extend 45° or 90° around the top portion 48 and the bottom portion 49 of the pipe 40. In yet another embodiment, the mats 33 may extend around a greater portion of the perimeter of the pipe 40, up to and including the entire perimeter. For example, a pipe 40 having mats 33 extending around the entire perimeter (e.g., 360°) may be used in an application where the exact orientation of the installed pipe 40 is not known or cannot be easily controlled (e.g., a jack pipe). It is noted that the mats 33 may have a curved configuration in order to be connected to the cylindrical cage(s) 46, 47. In the embodiment shown in FIG. 4, this configuration is accomplished by bending the cross-wires 34 into curved shapes, such that the tie wires 30 of the individual reinforcement elements 31 are relatively straight. In this configuration, the tie wires 30 and the reinforcement elements 31 extend in a longitudinal or axial direction on the pipe 40, and the cross-wires 34 extend in a circumferential direction. In other embodiments, the reinforcement structure may be differently configured, and it is understood that differently shaped pipes may utilize different structures. For example, a square shaped pipe (e.g., box culvert) may be subjected to significant shear forces at the corners of the pipe, and may therefore be provided with reinforcement mats 33 at the corners, as well as potentially with lock rods 32.

The embodiments of reinforcement structures, including prongs 10, reinforcement elements 31, and reinforcement mats 33, described herein provide benefits and advantages over existing designs. For example, as described above, the configuration of the prong 10 with the proximal ends 15 bent around the tie wire 30 before welding, increases the strength of the connection between the prong 10 and the reinforcement element 31. Consequently, the pull force necessary to separate the prong 10 from the tie wire 30 is increased, particularly relative to prongs that are welded to opposite sides of the tie wire 30 and do not wrap around the tie wire 30. In one embodiment, this pull force may be equal to the tensile strength of the prong 10. The reinforcement capabilities of the prong 10 and the reinforcement structures with which it is used are thereby increased. As another example, the prongs 10 may be connected to the reinforcement structure (e.g., the tie wire 30) in a wide variety of configurations. The prongs 10 can be positioned to have any desired spacing interval and/or may be oriented in any desired direction, etc., including being arranged in a spiral configuration. Still other benefits and advantages are explicitly or implicitly described herein and/or recognized by those skilled in the art.

While the specific embodiments have been illustrated and described, numerous modifications come to mind without significantly departing from the spirit of the invention, and the scope of protection is only limited by the scope of the accompanying Claims.

What is claimed is:

1. A concrete reinforcement element comprising:
   a tie wire having a length;
   a plurality of prongs connected along the length of the tie wire, each of the prongs being spaced from adjacent prongs, wherein each of the prongs comprises:
   a first leg and a second leg, with a bridge portion connecting the first leg and the second leg, wherein the bridge portion forms a first end of the prong distal from the tie wire, the first and second legs extending from the bridge portion to a second end of the prong opposite the first end, and wherein the second end of the prong is connected to the tie wire, wherein the prong extends outwardly away from a top side of the tie wire and has a length defined between the first and second ends, wherein the prong is elongated such that a maximum spacing between the first and second legs is smaller than the length of the prong, and wherein the first and second legs of each prong are straight, and the bridge portion of each prong has a curved shape that forms an arc of greater than 180 degrees,
   wherein each of the first and second legs has a proximal end at the second end of the prong, wherein the proximal end of the first leg extends on a first side of the tie wire and is bent toward the second leg to extend at least partially around an underside of the tie wire opposite the top side, and wherein the proximal end of the second leg extends on a second side of the tie wire opposite the first side and is bent toward the first side to extend at least partially around the underside of the tie wire,
   wherein the second end of each prong is connected to the tie wire by welding, such that at least a portion of each of the proximal ends of the first and second legs is welded to the underside of the tie wire.

2. The concrete reinforcement element of claim 1, wherein the element is configured such that an applied load sufficient to cause failure of one of the prongs when exerted on the bridge portion of the prong in a direction away from the tie wire is higher than a bond strength of the welding.

3. The concrete reinforcement element of claim 1, wherein the element is configured such that an applied load sufficient to cause failure of one of the prongs when exerted on the bridge portion of the prong in a direction away from the tie wire is approximately equal to an applied load sufficient to cause fracture of the prong.

4. The concrete reinforcement element of claim 1, wherein the proximal ends of the first and second legs overlap each other, and wherein confronting surfaces of the proximal ends of the first and second legs contact each other while overlapping.

5. The concrete reinforcement element of claim 1, wherein the at least a portion of each of the proximal ends of the first and second legs is welded to the underside of the tie wire defines a curved surface that is welded to the tie wire.

6. The concrete reinforcement element of claim 1, wherein the first and second legs of each prong are disposed at an acute angle to each other.

7. The concrete reinforcement element of claim 1, wherein the first end of each prong is a free end, such that each prong is secured only at the second end.

8. The concrete reinforcement element of claim 1, further comprising a lock rod connected to the second end of each of the prongs, such that each prong is secured only to the tie wire at the second end and to the lock rod at the first end.

9. The concrete reinforcement element of claim 1, wherein the bridge portion of each prong has a radius of curvature of about 0.5 inch.

10. The concrete reinforcement element of claim 1, wherein the proximal ends of the first and second legs of each prong each have a bend portion, and wherein the bend portion of each of the first and second legs is bent to an angle of at least 90° and not exceeding 135°.

11. A concrete reinforcement element comprising:
a tie wire having a length;
a plurality of prongs connected along the length of the tie wire, each of the prongs being spaced from adjacent prongs, wherein each of the prongs comprises:
a first leg and a second leg, with a bridge portion connecting the first leg and the second leg, wherein the bridge portion forms a first end of the prong distal from the tie wire, the first and second legs extending from the bridge portion to a second end of the prong opposite the first end, and wherein the second end of the prong is connected to the tie wire, and wherein the first and second legs of each prong are straight, and the bridge portion of each prong has a curved shape that forms an arc of greater than 180 degrees,
wherein each of the first and second legs has a proximal end at the second end of the prong, wherein the proximal end of the first leg extends on a first side of the tie wire and is bent toward the second leg to extend at least partially around an underside of the tie wire, and wherein the proximal end of the second leg extends on a second side of the tie wire opposite the first side and is bent toward the first side to extend at least partially around the underside of the tie wire,
wherein the second ends of each prong are connected to the tie wire by welding, such that at least a portion of each of the proximal ends of the first and second legs is welded to the underside of the tie wire, and wherein the first end of each prong is a free end, such that the prong is secured only at the second end.

12. The concrete reinforcement element of claim 11, wherein the proximal ends of the first and second legs of each prong each have a bend portion, and wherein the bend portion of each of the first and second legs is bent to an angle of at least 90° and not exceeding 135°.

13. A concrete reinforcement mat comprising:
a plurality of concrete reinforcement elements, each concrete reinforcement element comprising a tie wire having a length and a plurality of prongs connected along the length of the tie wire, each of the prongs being spaced from adjacent prongs, wherein each of the prongs comprises:
a first leg and a second leg, with a bridge portion connecting the first leg and the second leg, wherein the bridge portion forms a first end of the prong distal from the tie wire, the first and second legs extending from the bridge portion to a second end of the prong opposite the first end, and wherein the second end of the prong is connected to the tie wire, wherein the prong extends outwardly away from a top side of the tie wire and has a length defined between the first and second ends, and wherein the prong is elongated such that a maximum spacing between the first and second legs is smaller than the length of the prong, and wherein the first and second legs of each prong are straight, and the bridge portion of each prong has a curved shape that forms an arc of greater than 180 degrees,
wherein each of the first and second legs has a proximal end at the second end of the prong, wherein the proximal end of the first leg extends on a first side of the tie wire and is bent toward the second leg to extend at least partially around an underside of the tie wire opposite the top side, and wherein the proximal end of the second leg extends on a second side of the tie wire opposite the first side and is bent toward the first side to extend at least partially around the underside of the tie wire,
wherein the second end of each prong is connected to the tie wire by welding, such that at least a portion of each of the proximal ends of the first and second legs is welded to the underside of the tie wire; and
a plurality of cross-wires connected to the plurality of concrete reinforcement elements by connection to the tie wires, such that the concrete reinforcement elements are all positioned in spaced relation and extending along a first direction, and the cross-wires are connected between the concrete reinforcement elements in spaced relation to each other and extend along a second direction transverse to the first direction.

14. The concrete reinforcement mat of claim 13, wherein the prongs on each reinforcement element are not aligned with the prongs on adjacent reinforcement elements.

15. The concrete reinforcement mat of claim 13, wherein the mat is configured such that an applied load sufficient to cause failure of one of the prongs when exerted on the bridge portion of the prong in a direction away from the tie wire is higher than a bond strength of the welding.

16. The concrete reinforcement mat of claim 13, wherein the mat is configured such that an applied load sufficient to cause failure of one of the prongs when exerted on the bridge portion of the prong in a direction away from the tie wire is approximately equal to an applied load sufficient to cause fracture of the prong.

17. The concrete reinforcement mat of claim 13, wherein the at least a portion of each of the proximal ends of the first and second legs is welded to the underside of the tie wire defines a curved surface that is welded to the tie wire.

18. A reinforced concrete pipe comprising:

a concrete wall defining a central passage, wherein the concrete wall has an internal reinforcement structure comprising a plurality of concrete reinforcement elements embedded within the concrete wall, each concrete reinforcement element comprising a tie wire having a length and a plurality of prongs connected along the length of the tie wire, each of the prongs being spaced from adjacent prongs, wherein each of the prongs comprises:

a first leg and a second leg, with a bridge portion connecting the first leg and the second leg, wherein the bridge portion forms a first end of the prong distal from the tie wire, the first and second legs extending from the bridge portion to a second end of the prong opposite the first end, and wherein the second end of the prong is connected to the tie wire, and wherein the prong extends outwardly away from a top side of the tie wire and has a length defined between the first and second ends, and wherein the prong is elongated such that a maximum spacing between the first and second legs is smaller than the length of the prong, and wherein the first and second legs of each prong are straight, and the bridge portion of each prong has a curved shape that forms an arc of greater than 180 degrees, wherein each of the first and second legs has a proximal end at the second end of the prong, wherein the proximal end of the first leg extends on a first side of the tie wire and is bent toward the second leg to extend at least partially around an underside of the tie wire opposite the top side, and wherein the proximal end of the second leg extends on a second side of the tie wire opposite the first side and is bent toward the first side to extend at least partially around the underside of the tie wire, and wherein the second end of each prong is connected to the tie wire by welding, such that at least a portion of the proximal ends of the first and second legs is welded to the underside of the tie wire.

19. The reinforced concrete pipe of claim 18, wherein the concrete wall has a circular shape in cross-section, and wherein the internal reinforcement structure extends around an arc of approximately 45° to approximately 90° on a top portion and a bottom portion of the concrete wall.

20. The reinforced concrete pipe of claim 18, wherein the prongs on each reinforcement element are not aligned with the prongs on adjacent reinforcement elements.

* * * * *